US008619164B2

(12) United States Patent
Powell et al.

(10) Patent No.: US 8,619,164 B2
(45) Date of Patent: Dec. 31, 2013

(54) COMPLEMENTARY PIXEL RECONSTRUCTION

(75) Inventors: Calvin L Powell, Merritt Island, FL (US); Kevin F Williams, Orlando, FL (US); Michael C Snead, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 367 days.

(21) Appl. No.: 13/165,702

(22) Filed: Jun. 21, 2011

(65) Prior Publication Data
US 2011/0310275 A1  Dec. 22, 2011

Related U.S. Application Data

(60) Provisional application No. 61/357,438, filed on Jun. 22, 2010.

(51) Int. Cl.
*H04N 9/64* (2006.01)
*H04N 5/335* (2011.01)
*G06K 9/00* (2006.01)

(52) U.S. Cl.
USPC ............................ 348/246; 348/273; 382/149

(58) Field of Classification Search
USPC ............................ 348/246, 247, 273; 382/149
See application file for complete search history.

(56) References Cited

U.S. PATENT DOCUMENTS

| 5,274,224 A | 12/1993 | Poujois |
| 5,504,504 A | 4/1996 | Markandey et al. |
| 6,975,778 B1 | 12/2005 | Loce et al. |
| 7,786,438 B1* | 8/2010 | DeVilbiss et al. ............ 250/332 |
| 2007/0125951 A1* | 6/2007 | Snider et al. ............ 250/363.03 |
| 2007/0177819 A1* | 8/2007 | Ma et al. ...................... 382/284 |
| 2008/0122954 A1 | 5/2008 | Ting |
| 2009/0129663 A1 | 5/2009 | Chen |
| 2011/0033129 A1* | 2/2011 | Robinson ...................... 382/254 |
| 2011/0315881 A1* | 12/2011 | Knowles et al. ............ 250/352 |

FOREIGN PATENT DOCUMENTS

| EP | 0 998 124 A2 | 5/2000 |
| JP | 8-54855 A | 2/1996 |
| JP | 2005-278217 A | 10/2005 |
| JP | 2007-143131 A | 6/2007 |

* cited by examiner

*Primary Examiner* — Trung Diep
(74) *Attorney, Agent, or Firm* — Withrow & Terranova, PLLC

(57) ABSTRACT

Systems and methods for reconstructing pixel values at bad (i.e. fully or partially defective, saturated, and/or non-responsive in one or more spectral bands) pixel locations in multi-spectral photo-detectors are provided herein. A detector having pixel locations responsive in two or more spectral bands may have pixel values at bad pixel locations reconstructed from adjacent pixel location band ratios so long as the bad pixel location is operational/responsive in at least one spectral band. Pixel locations may be two (or more) color pixels, stacked FPAs, "virtual" locations created by mapping pixels in a first detector to pixels in a second detector, or "super pixels" defined on a detector with a patterned band-pass filter.

12 Claims, 9 Drawing Sheets

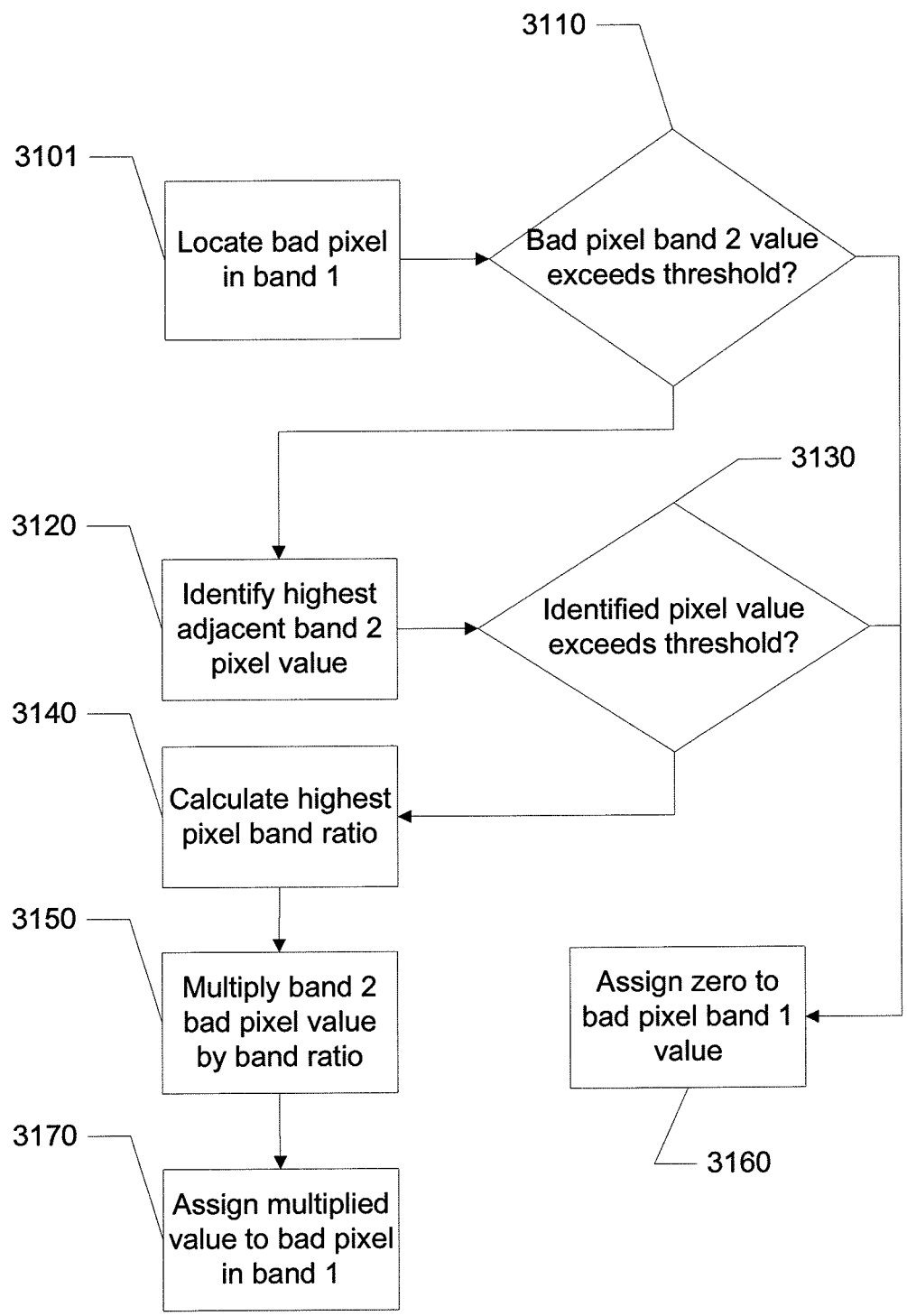

COMPLEMENTARY PIXEL RECONSTRUCTION

CROSS REFERENCE TO RELATED APPLICATIONS

This nonprovisional application claims the benefit of U.S. Provisional Application No. 61/357,438 filed on Jun. 22, 2010. The entire contents of the above application is hereby incorporated by reference.

BACKGROUND

Current production techniques for focal plane arrays (FPAs) show a non-linear relationship between cost and production yield. An FPA with 99.5% good (or compliant) pixels/picture elements costs significantly more than an FPA with 98.5% good pixels. As the number of operational pixels required in an FPA increases, production yields begin to drop off. This drives up the cost of an FPA and also drives up maintenance or replacement costs as pixels fail or are identified as defective within an FPA.

Current techniques for pixel value replacement or approximation employ techniques such as selecting the value of a neighboring pixel or otherwise making an approximation of what the missing pixel value should be based on weighted averages and/or interpolation techniques. Such techniques, however, are not well-suited for detection and tracking solutions as their main purpose is to eliminate artifacts in still images.

SUMMARY

Variations of the techniques and devices discussed herein pertain to a method of restoring a pixel value associated with a bad pixel site in a first frequency band in a photo-detector that detects in at least a first and a second frequency band at each pixel site, the method comprising: locating the bad pixel site for the first frequency band; identifying, from among pixel sites adjacent to the bad pixel site, a pixel site having the highest value in the second frequency band; calculating a first band ratio between said first frequency band and said second frequency band for said identified pixel site; and restoring, as the pixel value of the bad pixel site in the first frequency band, a pixel value first obtained by multiplying the value of the bad pixel site in the second frequency band by the calculated band ratio or its inverse; wherein the point-spreads of said first frequency band and said second frequency band are similar and at least part of the point-spread of the bad pixel site falls onto surrounding pixel sites.

In some variations of such a method, a pixel site is associated with a detector pixel capable of detecting the first and second wavebands. In other variations, each detector pixel is capable of detecting only the first or the second waveband. In such variations, a pixel site is a pixel array at least 2×2 in size and having at least two pixels for the first waveband and at least two pixels for the second waveband.

In some variations, the step of identifying includes the step of excluding from identification those pixel sites having more than a threshold difference between individual pixel values for the second frequency band. In other variations, the step of identifying includes the step of excluding from identification those pixel sites having less than a threshold value in the second frequency band.

In some variations, the detector detects in a third frequency band. In such variations, the method further includes the steps of: second identifying, from among pixel sites adjacent to the bad pixel site, a pixel site having the highest value in the third frequency band; and calculating a second band ratio between said first frequency band and said third frequency band for said second identified pixel site; where restoring further includes second obtaining a restored value by multiplying the value of the bad pixel site in the third frequency band by the second band ratio or its inverse and restoring, as the pixel value of the bad pixel site in the first frequency band, a pixel value computed by averaging the first obtained and second obtained pixel values.

Further variations may pertain to a non-transitory computer-readable medium having embodied thereon a program that, when executed by one or more processors, causes the processors to perform part or all of one of the above method variations.

Variations of the techniques and devices discussed herein may also pertain to a photo-detector that detects in at least a first and a second frequency band and has defective pixel value restoration capability, the detector comprising: a plurality of pixels in the first spectral band; a plurality of pixels in the second spectral band; a pixel identification map that identifies at least one bad pixel site in the photodetector for the first frequency band; a local pixel intensity comparator that identifies, from among pixel sites adjacent to the bad pixel site, the pixel site having the highest value in the second frequency band; a band ratio calculator that calculates a band ratio between the first and second frequency band values for the identified pixel site; and a value restorer that restores, as the pixel value in the first frequency band at the bad pixel site, the pixel value in the second frequency band at the bad pixel site multiplied by the calculated band ratio or its inverse; wherein the point-spreads of said first frequency band and said second frequency band are similar and at least part of the point-spread of the bad pixel site falls onto surrounding pixel sites.

In some detector variations, the plurality of pixels in the first spectral band are in a first focal plane array and the plurality of pixels in the second spectral band are in a second focal plane array and further where the pixel value in the first frequency band at the bad pixel site is in the first focal plane array and the pixel value in the second frequency band at the bad pixel site is in the second focal plane array.

In further detector variations, a pixel in the first spectral band is in the same planar position on the detector as a pixel in the second spectral band, such that a pixel site on the detector detects both the first and second spectral bands.

In yet further detector variations, a pixel in the first spectral band is adjacent to at least one pixel in the second spectral band and where a pixel site on the detector includes at least one pixel in the first spectral band and said at least one adjacent pixel in the second spectral band.

Further detector variations may include: a plurality of pixels in a third spectral band; wherein the local pixel intensity comparator second identifies, from among pixel sites adjacent to the bad pixel site, the pixel site having the highest value in the third frequency band; wherein the band ratio calculator calculates a second band ratio between the first and third frequency band values for the second identified pixel site; and wherein the value restorer restores, as the pixel value in the first frequency band at the bad pixel site, an average of the pixel value in the second frequency band at the bad pixel site multiplied by the calculated band ratio or its inverse and the pixel value in the third frequency band at the bad pixel site multiplied by the second band ratio or its inverse.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given herein below and the accompanying drawings which are given by way of illustration only, and thus are not limitative of the present invention, and wherein

FIG. 3b shows another embodiment of a pixel value reconstruction process as described herein;

Figure 1:
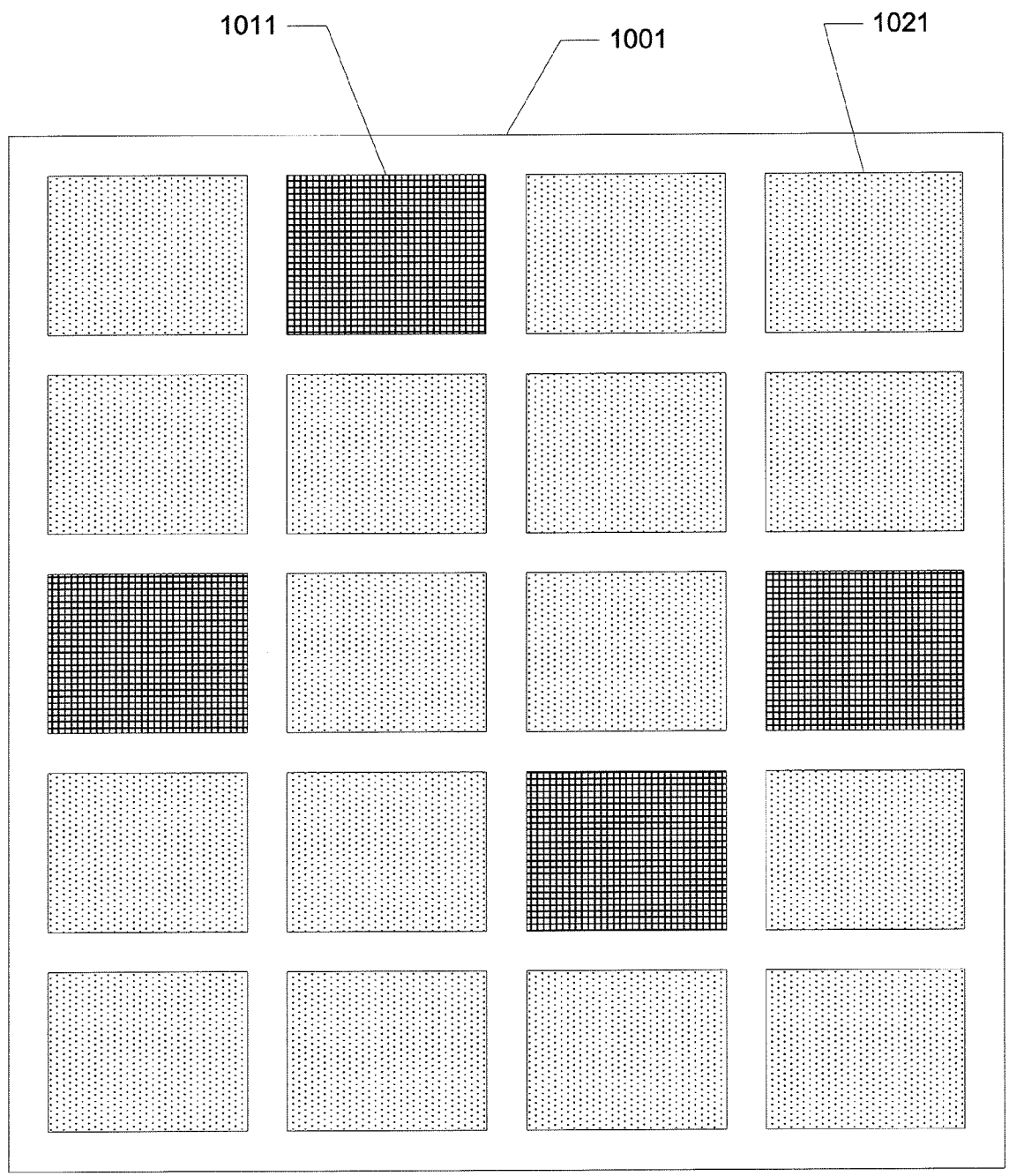
FIG. 1 shows a block diagram of an embodiment of a focal plane array having at least one defective, non-responsive or saturated pixel thereon.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

It would be an advance in the art to provide a pixel reconstruction technique that could be used to recover data from fully or partially defective, non-responsive and/or saturated pixels or pixel locations (hereafter referred to as "bad" pixels) in a focal plane array responsive to two or more spectral bands, or an array of focal planes where each focal plane array responds to a different spectral band.

One variation of a pixel reconstruction technique can realize significant improvements in performance for embodiments of a focal plane array where the pixels/pixel sites of the array operate in two or more wavebands. In some variations, a bad pixel site on such a focal plan array may still be operational and/or un-saturated in at least one of the detection wavebands.

In such variations, it is possible to reconstruct the value of that pixel site for the defective/saturated waveband based on knowledge of the band ratios of neighboring pixels and the value of the operational/responsive band(s) for that pixel site. It provides a slightly decreased detection capability on the bad pixel site and small clusters as opposed to losing or otherwise replacing the detection result in the bad pixel to a neighbor replacement method. This enables the creation and utilization of a performance margin over the specification by reclaiming detection data from a portion of the defective or saturated pixels.

In some variations, a threshold-based reconstruction technique may be used. In some such variations, a threshold signal count is required in both the bad pixel site and the donor pixel. Such variations are useful for reducing possible false alarm detections caused by reconstructed values. This is because neither clutter nor threats can occupy a single pixel beyond a certain signal level given finite apertures and proper spatial sampling.

In a situation where 75% of the bad pixels are one spectral band only and the solution provides usable data 75% of the time, an effective operational increase of 56% can be achieved according to variations of the pixel reconstruction techniques discussed herein.

Variations of such reconstruction techniques are especially useful in making an FPA behave as though it has a higher production yield without the exponential cost increase required for the production thereof In one example, a production yield that gives requested or required algorithm performance is 99.5% good pixels and the cost threshold for production yields is around 98.5%. Taking a 98.5% production yield process and applying a variation of a pixel reconstruction technique discussed herein during operation may, based on the 75% of 75% estimate above, cause the produced FPAs to behave as though they had a production yield of 99.34% good pixels as opposed to 98.5%.

An example of an FPA with defective pixels therein is shown in FIG. 1. In the example shown, the FPA 1001 has pixels 1021 responsive in two wavebands—band A and band B. Some of the pixels are defective 1011 in that they are only responsive in band B. Other variations may have pixels that are responsive only in band A. Yet further variations may have pixels responsive in more than two wavebands, with defective pixels being responsive in at least one of the wavebands. Yet further variations of an FPA may have some bad pixels that are unresponsive and/or saturated in a first waveband, whereas other bad pixels on the FPA may be saturated and/or unresponsive in a second waveband.

In one variation of a pixel reconstruction technique, one of the bands' pixels (in the example case: 2 bands) is preferably operational by some definition, there is preferably some degree of the point-spread function ("pint-spread") that falls onto surrounding pixels, and that the point-spreads of at least two of the bands should be similar. Such a variation of a pixel reconstruction technique may use the observation (and physical fact) that the ratio of the band values seen in the tails of the point-spread are representative of the band ratios in the peak of the point-spread. By using the value (determined several ways) of the band ratio and the operational/responsive pixel's value, an estimate of the bad pixel's value may be obtained. The information as to the value of any single band can readily be calculated with a reasonable degree of accuracy.

Figure 2A:
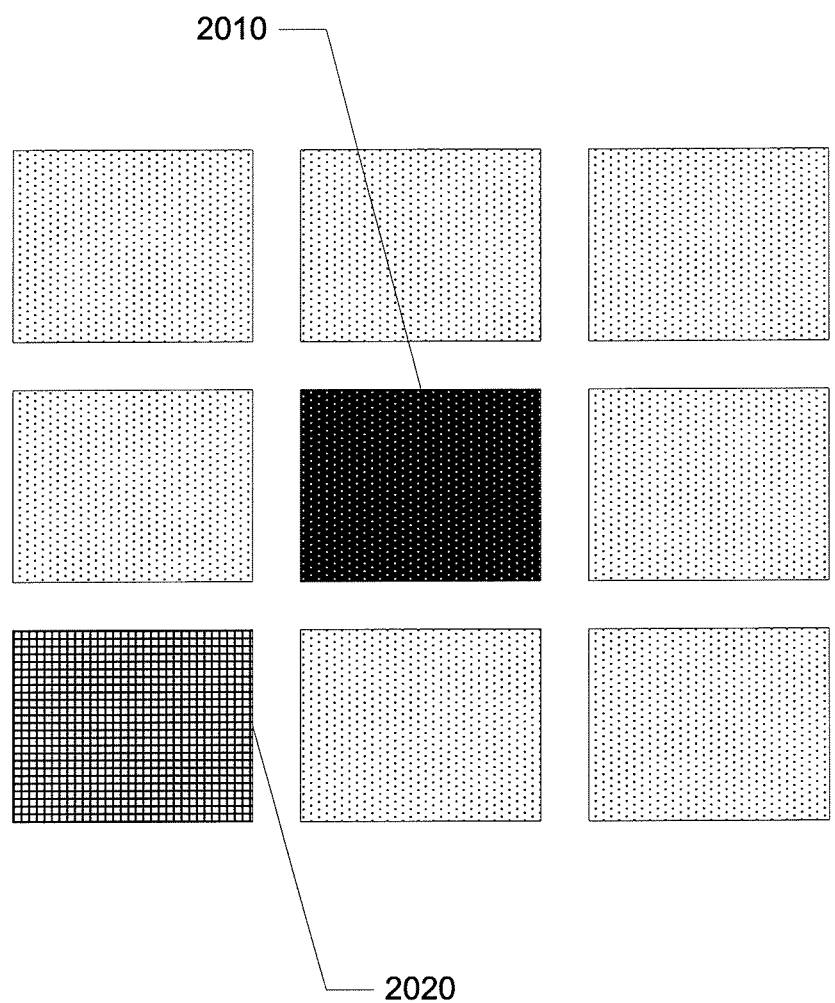
FIG. 2a shows a block diagram of an embodiment of a pixel group centered on a defective, non-responsive or saturated pixel.

In a scenario where each pixel location on an FPA is responsive to two or more frequency bands, a pixel location that is defective or saturated with respect to one frequency band but not the other can have its total pixel value reconstructed instead of merely replacing the pixel value with a neighbor value or a weighted average thereof. In such a variation, the method begins by locating a bad pixel via the bad pixel map for a particular band (Say, band A). An example of an FPA area with a bad pixel site therein is shown in FIG. 2a. The bad/saturated pixel 2010 is preferably responsive in 2 or more wavebands and is operational and un-saturated in at least one waveband.

Once the bad pixel site 2010 is located, the next step is to identify, from among the pixels adjacent to the bad pixel 2010 location, that pixel having the highest value in an opposing waveband 2020 (one in which the bad pixel 2010 is saturated or non-operational). This identification may be done either during or after pixel read-out depending on the read-out circuitry associated with the FPA. Some variations may use programmable and/or configurable read-out integrated circuits (ROICs) that may be configured to identify bad pixel sites and/or programmed with a map indicating which pixels are known or suspected to be defective.

Figure 3A:
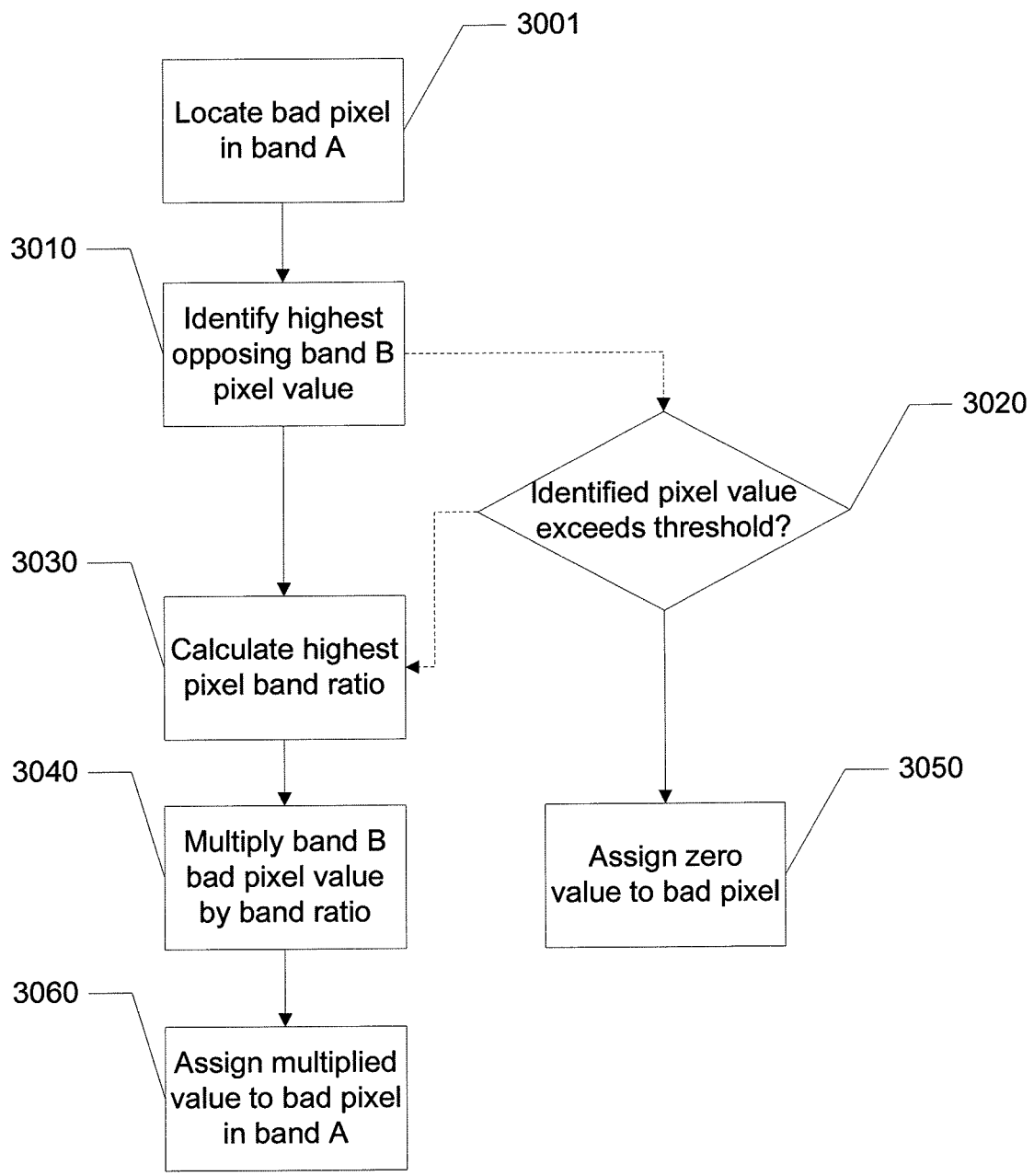
FIG. 3a shows an embodiment of a pixel value reconstruction process as described herein.

A flowchart depicting an embodiment of such a pixel reconstruction method is shown in FIG. 3a. After the bad pixel site in a given band is located 3001, an adjacent pixel having the highest value in an opposing band is identified 3010. Once identified, the band ratio of that highest value pixel is calculated 3030 ($S_{hi}$=band A/hand B), and then the value of live pixel in band B is multiplied at the bad pixel in band A (one of the 2 bands is live by definition) by the band ratio ($S_{hi}$) 3040 or it's inverse to obtain the new estimate of pixel value at band A. This new estimate value is then assigned to the band A pixel value for the bad pixel site 3060. Therefore the defective band A pixel value is re-constructed based on its related band B value and the spectral ratio at the most intense adjacent pixel.

For a bad pixel site having a defective, saturated, and/or non-operational band P and a an operational/responsive reference band R, the bad (P) band value for a pixel site of interest (POI) may be restored by, for example, applying the donor pixel's band ratio (P/R) to the reference (R) band value of the POI.

The advantage of such a method is that only a donor spectral ratio is taken as opposed to a donor pixel value. In some variations, if there is no activity in the live pixel location in band B or if the pixel value does not exceed a threshold level 3020, bad pixel site band A is merely 'reconstructed' to a zero value as well 3050—regardless of the donor spectral ratio. This reduces false alarms during detection and tracking by considering the overall activity level of the pixel location in both bands instead of doing a wholesale value replacement.

Yet further variations of such pixel reconstruction techniques and associated components may be configured to operate in n-band environments. An FPA having pixel sites responsive in any number of wavebands may have pixel values in n-1 wavebands reconstructed at a bad pixel location so long as that bad pixel location is responsive in at least one waveband. In such a solution, the band ratios for each of the n-1 wavebands would be calculated from the neighbor pixel site(s) having the highest value for each waveband with respect to one of the wavebands in which the bad pixel site is responsive.

Figure 2B:
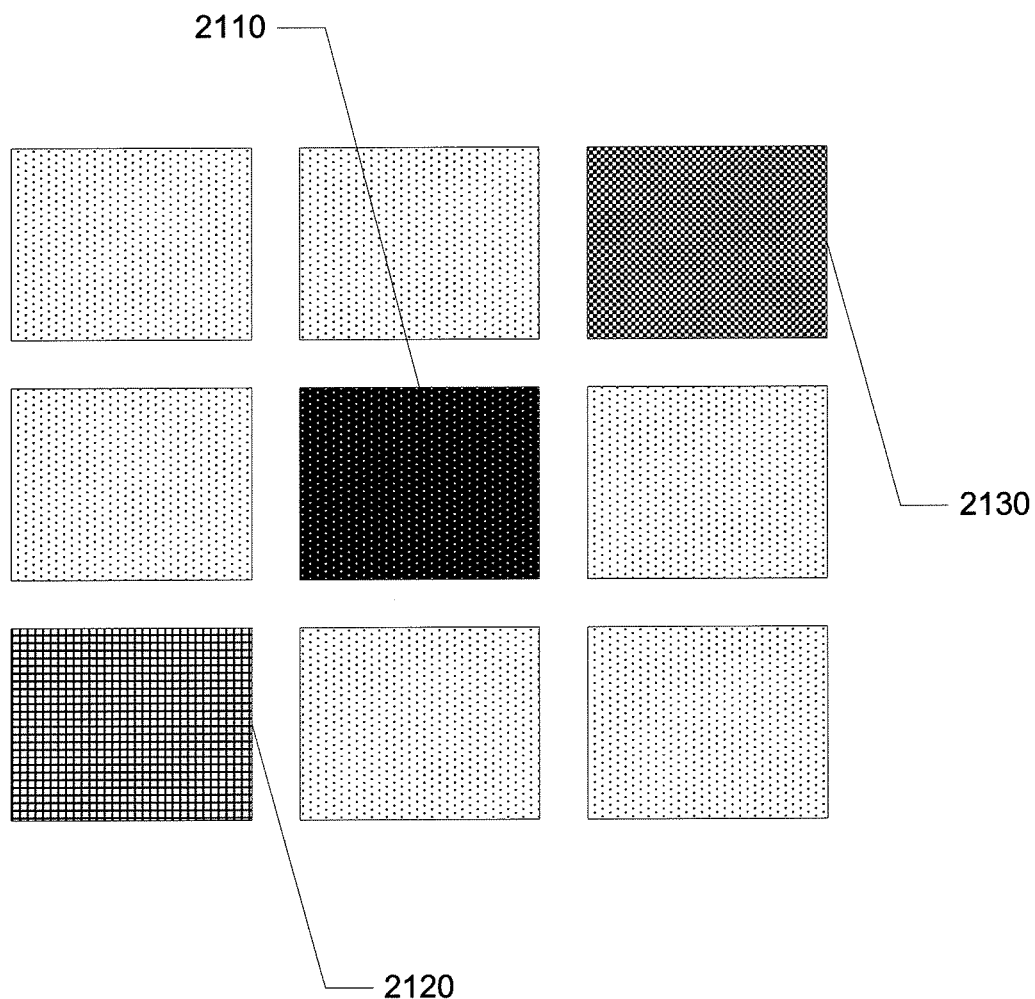
FIG. 2b shows a block diagram of an embodiment of a pixel group centered on a defective, non-responsive or saturated pixel.

For example, FIG. 2b depicts an embodiment of a portion of a stacked 3-color FPA having a bad pixel site 2110 that is responsive only in waveband A (from possible wavebands A, B, and C). Waveband B is reconstructed, by identifying an adjacent pixel with the highest value in waveband B 2120, calculating the band ratio between waveband B and waveband A, and applying that band ratio to the bad pixel site's 2110 waveband A value to reconstruct its waveband B value. Waveband C is similarly reconstructed by identifying an adjacent pixel with the highest value in waveband C 2130, calculating the band ratio between waveband C and waveband A, and applying that band ratio to the bad pixel site's 2110 waveband A value to reconstruct its waveband C value.

In such variations, the process of FIG. 3a may be applied iteratively and/or in parallel for each of the wavebands to be reconstructed. For a "bad" pixel responsive in more than one waveband, variations may select one of the working wavebands for an adjacent-pixel band ratio calculation or may be configured to employ all of the working wavebands to "average out" the waveband ratio.

Figure 2C:
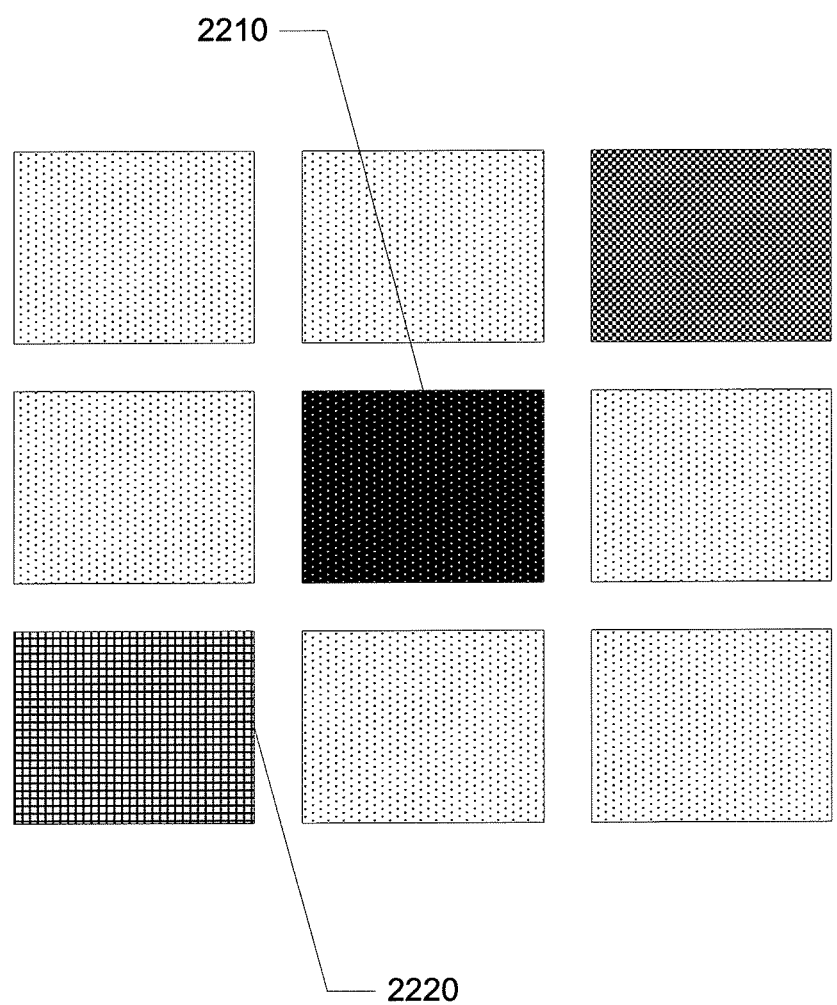
FIG. 2c shows a block diagram of an embodiment of a pixel group centered on a defective, non-responsive or saturated pixel.

For example, FIG. 2c depicts an embodiment of a portion of a stacked, 3-color FPA having a bad pixel site 2210 that is responsive in wavebands A and B, but not responsive in waveband C. Waveband C may be reconstructed by choosing either waveband A or B and calculating the band ratio with respect to that waveband from an adjacent pixel having the highest value in waveband C 2220. The choice of waveband A or B may be based on parameters/logic in the ROIC (if a programmable/smart ROIC is used) and/or reconstruction program/logic in post read-out components. A particular waveband may be more important or more sensitive to objects in a particular application/implementation, for example. In other variations, the choice of waveband A or B may simply be based on the first working waveband detected by the ROIC and/or reconstruction program/logic.

In anther variation, waveband C may be reconstructed by calculating band ratios for both waveband A and waveband B and combining the calculated band ratios according to a formula. Such a formula may simply be an average, or may be weighted based on the particular spectral characteristics of the bands or some other programmed or externally defined parameter.

Further variations of such a pixel reconstruction method may restore pixel values when the signal is above a threshold value at the pixel of interest (POI) and at the 'donor' ($B_{hi}$) pixel, thereby further reducing false alarms during detection and tracking that may otherwise arise from wholesale pixel value replacement. Such a variation is depicted in FIG. 3b.

Once a bad pixel site in a first waveband (band A) is located 3101, the value of that pixel in the second waveband (band B) is measured to determine if it exceeds a threshold level 3110.

If the band B value of the bad pixel site exceeds a threshold level, the highest adjacent band B pixel value is identified 3120 and also compared against a threshold level 3130. If either the bad pixel site or highest pixel band B values do not meet a threshold level, a zero level is assigned to the bad pixel site in band A 3160. Otherwise the pixel band ratio is calculated at the highest adjacent pixel 3140. This band ratio is then applied to the band B pixel value at the bad pixel site 3150 and the resultant value is used as the reconstructed band A pixel value 3170.

The advantages of this method lie partially in the fact that neither clutter nor threats can occupy a single pixel beyond a certain signal level. As such, only a representative spectral ratio from nearby pixels is necessary to compute the missing pixel value with a high level of accuracy.

Figure 4A:
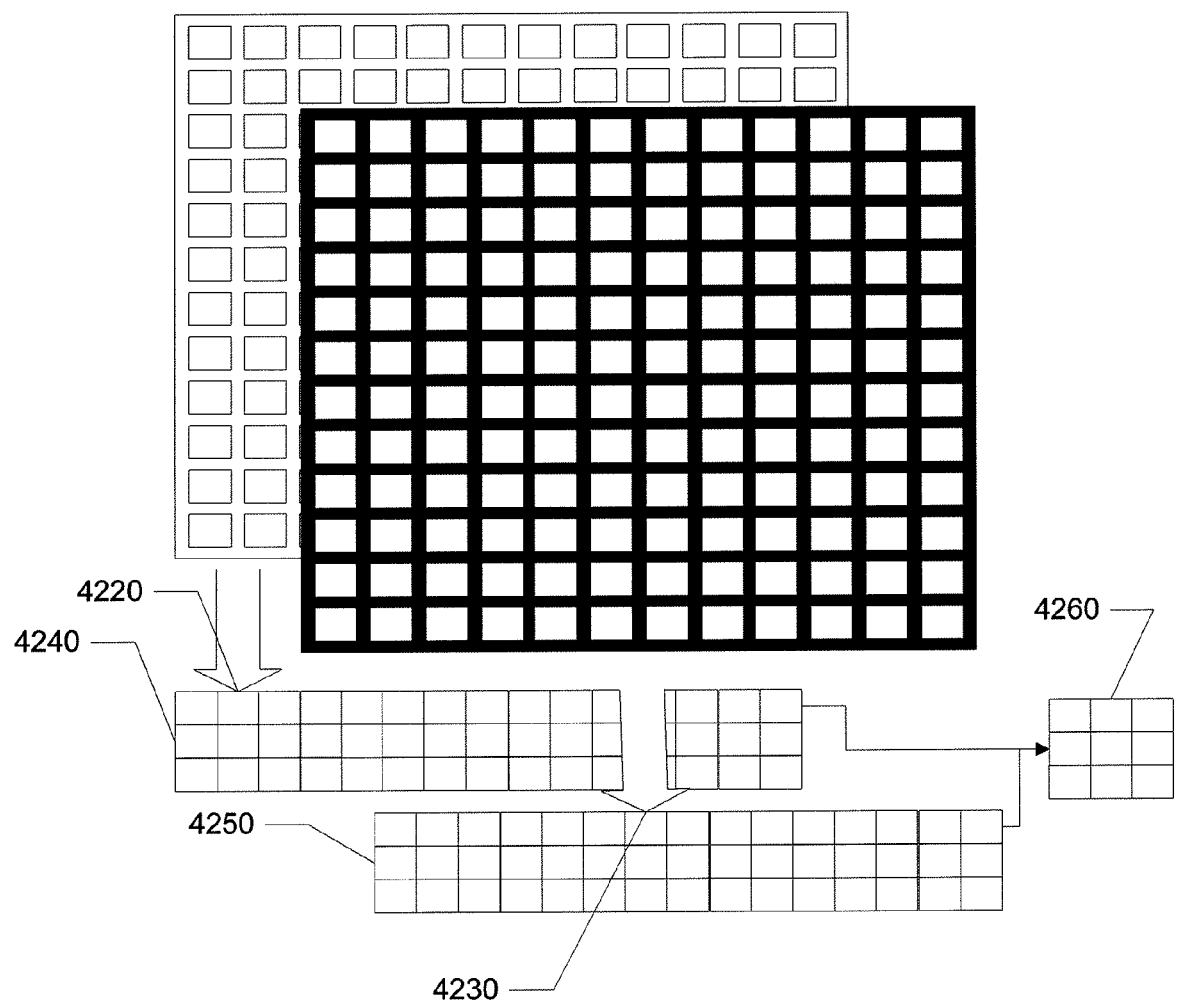
FIG. 4a show a block diagram of a ROIC configured to perform pixel reconstruction.

The solution may be performed by specialized components disposed on or connected to a photo-detector such that the pixel value restoration happens automatically after or during pixel data read-out. Alternately, the solution may be performed with an ASIC, FPGA, micro-processor, computer, or similar data processing device configured or programmed to carry out the solution on incoming pixel values with reference to one or more pixel maps. A block diagram depicting read-out operations of such a read-out circuit is shown in FIG. 4a.

A readout circuit that reads n rows of pixels into a parallel buffer before reading them through the final stage could be used to perform variations of the pixel reconstruction techniques discussed herein. In one variation, N number of serial registers 4240 4250 may be used, as opposed to a single register, to perform spatial filtering functions of the linear and non-linear types. Some variations may perform 3×3 filtering techniques, but in other variations the size of the operational group is expandable to larger filter sizes. Just as single lines read out through a number of possible functions, n rows may be read out 4220 into a set of serial registers 4240 4250 and then read into an operation node 4260 that performs a number of hardware operations such as complementary pixel reconstruction, linear and non-linear filtering, etc.

The output of each pixel shift is a single pixel from the center serial register that has undergone a spatial process. This concept may be extended to 2 colors by aligning the readout pixels to be at the node at the same time. An FPA architecture that keeps a frame in memory to perform this function could be used in time as well to perform temporal differencing.

In some variations, one row at a time is read into 4220 4230 the serial registers and one pixel at a time reads out. The operational node 4260 may then take n×1 pixels at each pixel readout interval such that the node has the next pixel of interest and all of the surrounding pixels required to perform the operation.

In some variations of such an ROIC architecture, multiple spatial operations may be performed and the combined results packed into a single pixel with extended bit structure. Such an approach may minimize the need for downstream hardware components that would otherwise perform the same/similar features.

For pixel reconstruction variations, the readout architecture may be designed to input n×m pixels from all bands simultaneously and perform multi-band spatial operations such as complementary pixel replacement/reconstruction and selected spectral formulations usable directly in discrimination.

One variation of a ROIC configured for pixel reconstruction may be configured to perform offset and gain correction at the register read-out stage utilizing the gain or offset table to hold a map of defective pixels marked for replacement. The n columns of n×1 pixels read into the node as pixels are shifted through allow for a simple sort to select the appropriate donor pixel in the surrounding pixels. Some variations may require 2 or more sort operations to accomplish this. The background and pedestal values (generally the lowest-valued pixel) are preferably determined first and subtracted from each of the surrounding pixel values for each color. Then the highest remaining value in the band of interest may be selected as the donor pixel. The spectral ratio can then be used to reconstruct the missing band value.

Variations of such a pixel reconstruction process may also be used to extend the dynamic range of a given FPA as reconstruction of large signals often exceeds the bit range of the digitizer. For example, it is possible to recover as much as 17 bits of signal from a 15-bit digitizer.

Figure 4B:
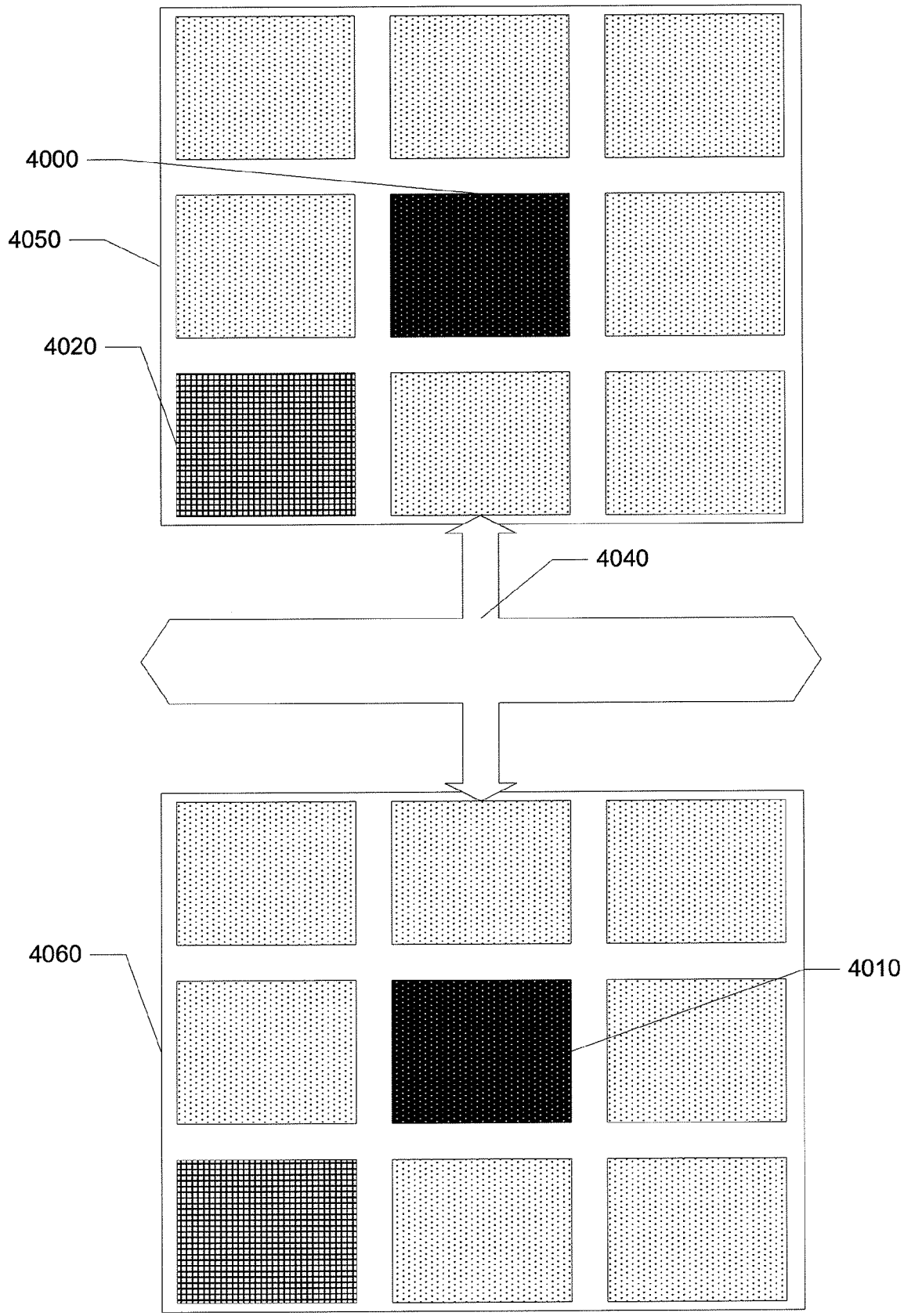
FIG. 4b shows a block diagram of a beam-split two-color, multi-FPA detector.

In another FPA arrangement variation, shown in FIG. 4*b*, two or more FPAs 4050, 4060 may be arranged in an optical detector such that they each receive an identical image from a beam-splitter 4040. Each FPA may have a different spectral response, however. To reconstruct the value of a bad pixel site 4010 in FPA A, it is first necessary to locate the analogous pixel location 4000 in FPA B. As in the single-FPA method, the spectral ratio of the highest-value adjacent pixel 4020 to analogous pixel B is calculated. This spectral ratio, or its inverse, is then multiplied at bad pixel site A 4010 by the value of analogous pixel B, thereby reconstructing the bad pixel site value in FPA A.

Figure 5:
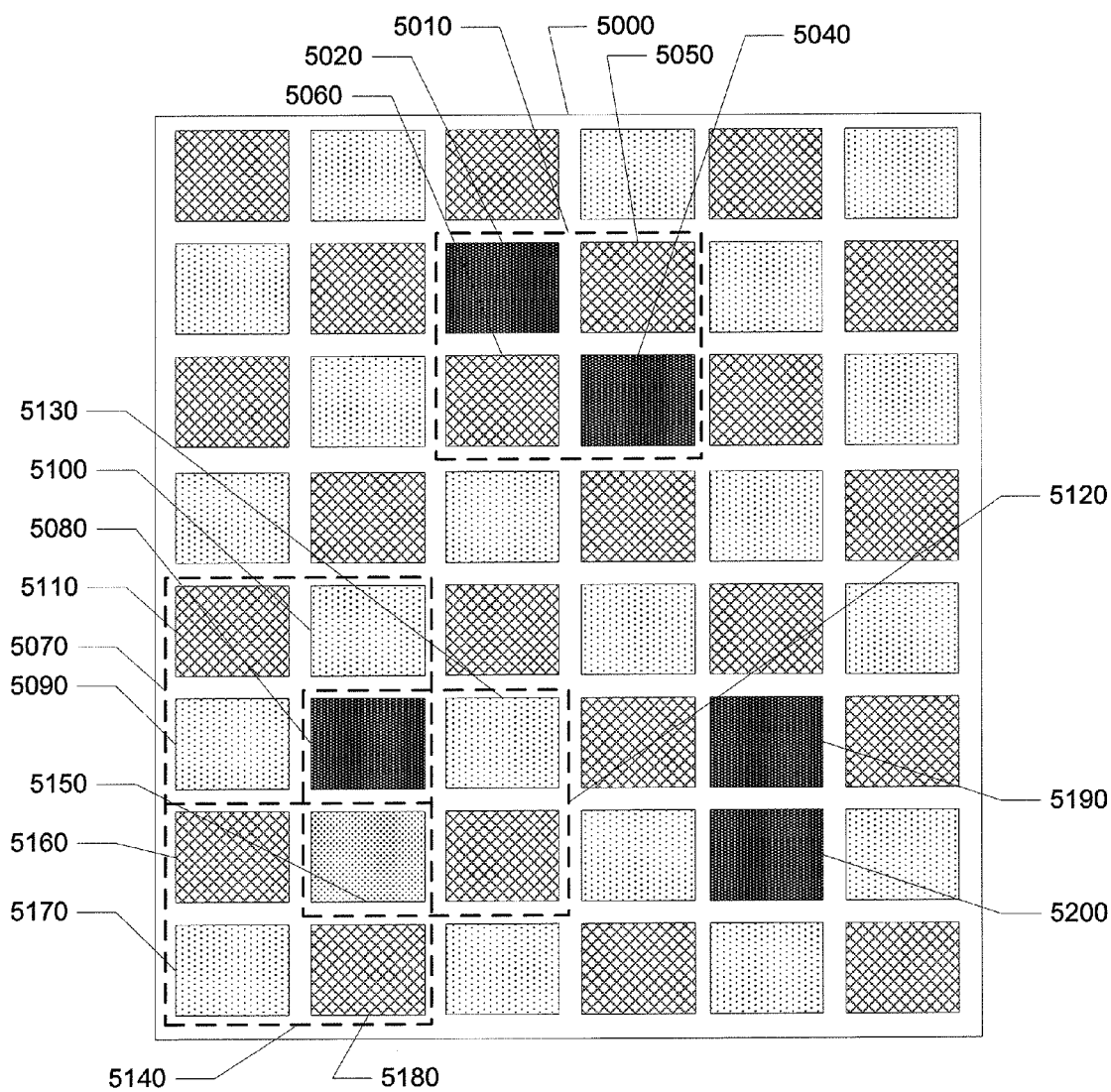
FIG. 5 shows a block diagram of an embodiment of an FPA with a patterned waveband filter.

In yet another variation, shown in FIG. 5, an FPA may be a "checkerboard" type 5000 with pixels responsive in waveband A 5110 alternating with pixels responsive in waveband B 5100. In some variations, this may be accomplished with certain types of patterned band-pass filters. In some variations, waveband A may be a narrow waveband included in broader waveband B, or vice-versa. In other variations, wavebands A and B may be non-overlapping or only partially overlapping.

In such a variation, a bad pixel site of waveband A 5080 may be reconstructed by taking a 2×2 pixel block 5070 that includes the bad pixel site 5080 and two adjacent pixels in waveband B 5100, 5090. This block 5070 can be treated as a "super pixel" for reconstruction purposes. The band B value for the "super pixel" 5070 may be determined by combining the waveband B pixel values 5100, 5090 and taking an average of the values. In some variations, a weighted average may be used.

In some variations, the values of the two band B pixels 5100, 5090 may be to disparate to allow for computation of a meaningful/useful average. In such instances, all four band B pixels 5090, 5100, 5130, 5150 adjacent to the bad pixel site 5080 may be evaluated to locate a pixel pair 5150, 5130 having the least difference between the two pixel values. A new "super pixel" 5120 may then be defined around that pixel pair.

Once a "super pixel" 5070 is defined and a value determined for waveband B in that "super pixel," the 8 adjacent "super pixels" are analyzed to find the one having the highest value for waveband A 5140. A spectral ratio may then be calculated based on an averaged/composite waveband A value determined from the waveband A pixels 5160, 5180 and an averaged/composite waveband B value determined from the waveband B pixels 5150, 5170. The composite waveband B value of the "super pixel" containing the defective pixel 5070 may then be multiplied by the spectral ratio and used as the value for the defective pixel 5070.

In some variations, a "super pixel" 5010 may have both two defective pixels 5020, 5040 in a waveband. Because it is only necessary for the pixels of the opposite waveband 5060, 5050 to be functioning in the super pixel 5010, the pixel value reconstruction process is the same for two defective pixels in a super pixel as it is for one. The only difference is that the composite value of the opposite waveband is multiplied by the spectral ratio and used as the pixel value for both defective pixels.

In some variations, a defective pixel of waveband A 5200 may be directly adjacent to a defective pixel of waveband B 5190. In such situations, each defective pixel may be segregated into a different "super pixel" such that each super pixel having a defective pixel therein, has no defective pixels in the opposite waveband. Pixel reconstruction for each pixel 5190, 5200 would proceed as described above without regard or compensation for there being an adjacent super pixel also having a defective pixel in an opposite waveband therein. The effects of the defective pixel would be automatically factored out of the calculation in most cases because the defective pixel reduces the composite pixel value in the waveband, thereby making it unlikely that such a super pixel will be selected as a reference set for pixel value reconstruction.

In some variations, the "super pixels" may be fixed instead of dynamically identified and selected based on either a pixel map and/or actual read-out values. In one such fixed variation, overlapping "super pixels" may be used such that each super pixel includes at least one FPA pixel from another super pixel. For an FPA having N*M pixels, such an approach creates (N−1)*(M−1) possible super pixels. Such a scheme may allow fast addressing of 4-pixel groups while allowing for localized (or FPA-wide) "super pixel" offsets depending on whether it is preferred to have a defective pixel at the top, bottom, left, and/or right of the super pixel.

Further variations may include patterned filters having more than two different wavebands. Yet further variations may involve combinations of FPA types and approaches, such as two checkerboard-type FPAs with a beam splitter, or a stacked FPA with a patterned filter, or other variations/combinations thereof.

Further variations of either the single FPA or multiple FPA approaches may be devised for scenarios involving fully or partially overlapping frequency bands (where the spectral ratio calculation may be done by determining a difference between band intensities) or scenarios involving more than two spectral bands (where spectral ratio calculation may involve various weighting or averaging techniques).

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of restoring a pixel value associated with a bad pixel site in a first frequency band in a photo-detector that detects in at least a first and a second frequency band at each pixel site, the method comprising:
   locating the bad pixel site for the first frequency band;
   identifying, from among pixel sites adjacent to the bad pixel site, a pixel site having the highest value in the second frequency band;
   calculating a first band ratio between said first frequency band and said second frequency band for said identified pixel site; and
   restoring, as the pixel value of the bad pixel site in the first frequency band, a pixel value first obtained by multiplying the value of the bad pixel site in the second frequency band by the calculated band ratio or its inverse;
   wherein the point-spreads of said first frequency band and said second frequency band are similar and at least part of the point-spread of the bad pixel site falls onto surrounding pixel sites.

2. The method of claim 1, where a pixel site is associated with a detector pixel capable of detecting the first and second wavebands.

3. The method of claim 1, where each detector pixel is capable of detecting only the first or the second waveband and where a pixel site is a pixel array at least 2×2 in size and having at least two pixels for the first waveband and at least two pixels for the second waveband.

4. The method of claim 3, where said identifying includes the step of excluding from identification those pixel sites having more than a threshold difference between individual pixel values for the second frequency band.

5. The method of claim 1, where said identifying includes the step of excluding from identification those pixel sites having less than a threshold value in the second frequency band.

6. The method of claim 1, where the detector detects in a third frequency band and where the method further includes the steps of:
   second identifying, from among pixel sites adjacent to the bad pixel site, a pixel site having the highest value in the third frequency band; and
   calculating a second band ratio between said first frequency band and said third frequency band for said second identified pixel site; and
   where restoring further includes second obtaining a restored value by multiplying the value of the bad pixel site in the third frequency band by the second band ratio or its inverse and restoring, as the pixel value of the bad pixel site in the first frequency band, a pixel value computed by averaging the first obtained and second obtained pixel values.

7. A non-transitory computer-readable medium having embodied thereon a program that, when executed by one or more processors, causes the processors to perform part or all of a method of restoring a pixel value associated with a bad pixel site in a first frequency band in a photo-detector that detects in at least a first and a second frequency band at each pixel site, the method comprising:
   locating the bad pixel site for the first frequency band;
   identifying, from among pixel sites adjacent to the bad pixel site, a pixel site having the highest value in the second frequency band;
   calculating a first band ratio between said first frequency band and said second frequency band for said identified pixel site; and
   restoring, as the pixel value of the bad pixel site in the first frequency band, a pixel value first obtained by multiplying the value of the bad pixel site in the second frequency band by the calculated band ratio or its inverse;
   wherein the point-spreads of said first frequency band and said second frequency band are similar and at least part of the point-spread of the bad pixel site falls onto surrounding pixel sites.

8. A photo-detector that detects in at least a first and a second frequency band and has defective pixel value restoration capability, the detector comprising:
   a plurality of pixels in the first spectral band;
   a plurality of pixels in the second spectral band;
   a pixel identification map that identifies at least one bad pixel site in the photodetector for the first frequency band;
   a local pixel intensity comparator that identifies, from among pixel sites adjacent to the bad pixel site, the pixel site having the highest value in the second frequency band;
   a band ratio calculator that calculates a band ratio between the first and second frequency band values for the identified pixel site; and
   a value restorer that restores, as the pixel value in the first frequency band at the bad pixel site, the pixel value in the second frequency band at the bad pixel site multiplied by the calculated band ratio or its inverse;
   wherein the point-spreads of said first frequency band and said second frequency band are similar and at least part of the point-spread of the bad pixel site falls onto surrounding pixel sites.

9. The photo-detector of claim 8, where the plurality of pixels in the first spectral band are in a first focal plane array and the plurality of pixels in the second spectral band are in a second focal plane array and further where the pixel value in the first frequency band at the bad pixel site is in the first focal plane array and the pixel value in the second frequency band at the bad pixel site is in the second focal plane array.

10. The photo-detector of claim 8, where a pixel in the first spectral band is in the same planar position on the detector as a pixel in the second spectral band, such that a pixel site on the detector detects both the first and second spectral bands.

11. The photo-detector of claim 8, where a pixel in the first spectral band is adjacent to at least one pixel in the second spectral band and where a pixel site on the detector includes at least one pixel in the first spectral band and said at least one adjacent pixel in the second spectral band.

12. The photo-detector of claim 8, the detector further comprising:

a plurality of pixels in a third spectral band;
wherein the local pixel intensity comparator second identifies, from among pixel sites adjacent to the bad pixel site, the pixel site having the highest value in the third frequency band;
wherein the band ratio calculator calculates a second band ratio between the first and third frequency band values for the second identified pixel site; and
wherein the value restorer restores, as the pixel value in the first frequency band at the bad pixel site, an average of the pixel value in the second frequency band at the bad pixel site multiplied by the calculated band ratio or its inverse and the pixel value in the third frequency band at the bad pixel site multiplied by the second band ratio or its inverse.

* * * * *